(12) United States Patent
Gyasi

(10) Patent No.: US 10,666,781 B1
(45) Date of Patent: May 26, 2020

(54) ERGONOMIC ACCESSORY HOLDER FOR A PORTABLE ELECTRONIC DEVICE AND ASSOCIATED METHODS

(71) Applicant: King David Gyasi, Dumfries, VA (US)

(72) Inventor: King David Gyasi, Dumfries, VA (US)

( * ) Notice: Subject to any disclaimer, the term of this patent is extended or adjusted under 35 U.S.C. 154(b) by 0 days.

(21) Appl. No.: 16/586,938

(22) Filed: Sep. 28, 2019

(51) Int. Cl.
*H04M 1/02* (2006.01)

(52) U.S. Cl.
CPC ....... *H04M 1/0279* (2013.01); *H04M 1/0274* (2013.01)

(58) Field of Classification Search
CPC ............................ H04B 1/3883; H04M 1/0279
See application file for complete search history.

(56) References Cited

U.S. PATENT DOCUMENTS

| | | |
|---|---|---|
| 9,787,808 B1 | 10/2017 | Gyasi |
| 2017/0366652 A1* | 12/2017 | Boerckel ........... H04M 1/72527 |
| 2018/0332153 A1* | 11/2018 | Brown .................... H04M 1/04 |

* cited by examiner

*Primary Examiner* — Hsinchun Liao
(74) *Attorney, Agent, or Firm* — Ashkan Najafi

(57) ABSTRACT

An ergonomic accessory holder includes a single and continuous body affixed to a rear side of the existing portable electronic device. Such a body includes a plurality of contiguous sides configured at an end-to-end pattern spaced inwardly from an outer perimeter of the existing portable electronic device, and a posterior face integral with the contiguous sides and monolithically attached thereto. Such a posterior face further is intermediately seated between the contiguous sides. Advantageously, the posterior face has a surface area less than a surface area of a rear side of the existing portable electronic device such that the body does not block a camera lens of the existing portable electronic device. A charging cable may be removably stored within a groove formed in the posterior side of the body.

13 Claims, 8 Drawing Sheets

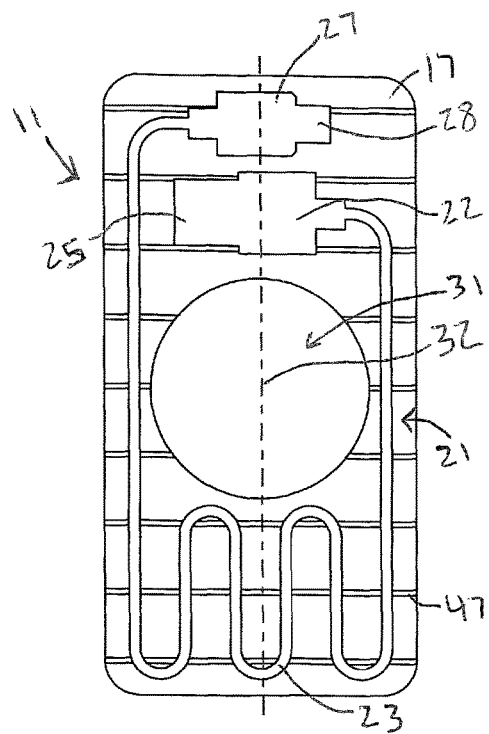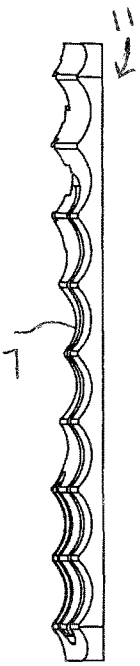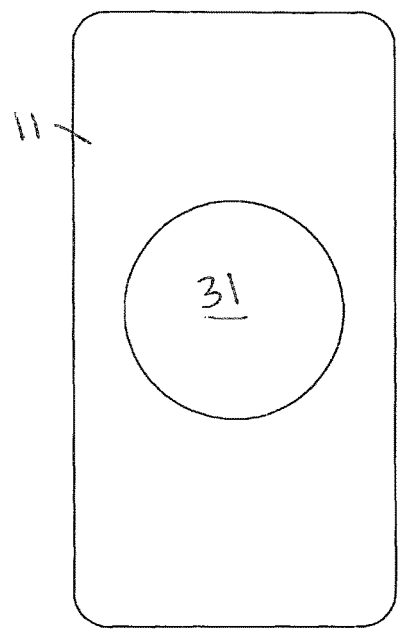
FIG. 5  FIG. 5A  FIG. 5B
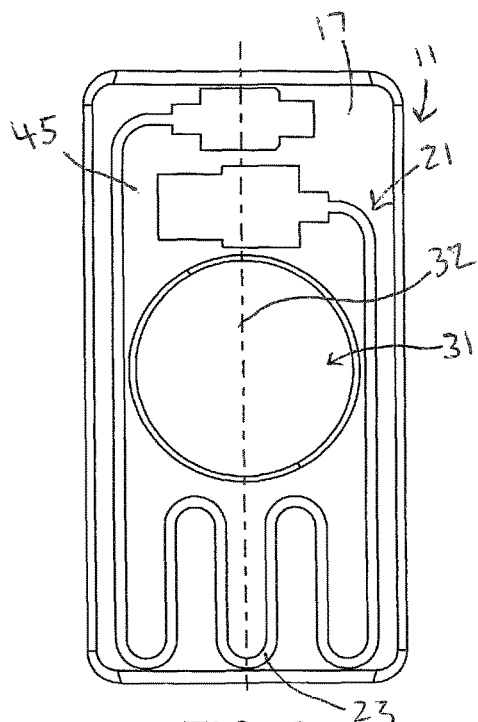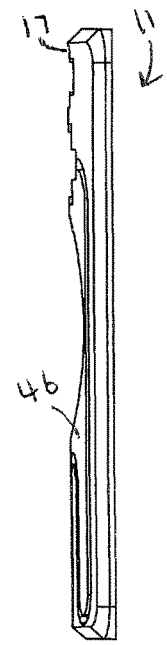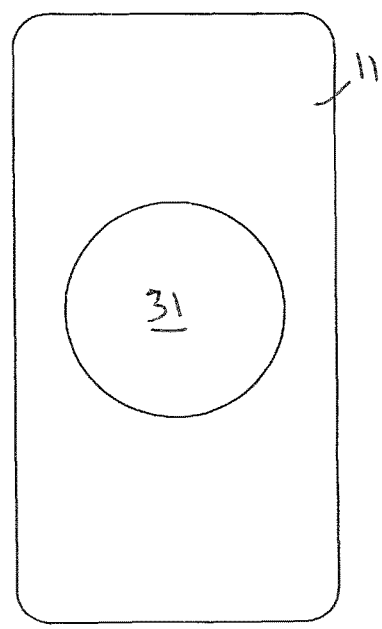
FIG. 6  FIG. 6A  FIG. 6B

ERGONOMIC ACCESSORY HOLDER FOR A PORTABLE ELECTRONIC DEVICE AND ASSOCIATED METHODS

CROSS REFERENCE TO RELATED APPLICATIONS

Not applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to phone accessories and, more particularly, to an ergonomic accessory holder for a portable electronic device. The present application discloses at least one embodiment that is patentably distinguishable relative to U.S. Pat. No. 9,787,808, which is owned by the Applicant of the present application.

Prior Art

Portable electronic devices such as a smart phone, an IPAD®, a tablet, and the like are designed such that a battery thereof is charged by a charging cable which is separately provided. However, the charged battery usually has a short life, so that it cannot be used for more than a day or two. Thus, when making a long call while being out or when making a long trip, such as an unexpected business trip, the battery may become discharged. In this case, it is impossible to make a call using the portable electronic device. Therefore, when going out, a user must carry a charging cable, thus causing inconvenience to the user.

Recently, portable electronic devices provide various multimedia functions, including a picture display function, a banking function, an MP3 player function, a gaming function, and other functions, so that it is possible to allow a user to access various services using only the portable electronic device. However, when using these functions, the power of the battery is rapidly exhausted. In this case, the battery may become discharged in only one day, so that it is difficult to use all of the desired multimedia functions.

The aforementioned charging cable is cumbersome to carry with the portable electronic device because the charging cable is often misplaced or does not match the dedicated charging terminal for the portable electronic device. Charging cables may be stored in a user's pocket, briefcase, purse, or handheld during transport. This may result in misplacing and forgetting to store charging cables at inopportune times. As can be appreciated, maintaining charging cables at or near the portable electronic device can be inconvenient to a user because they require regular monitoring to avoid losing the charging cable.

Accordingly, a need remains for an ergonomic accessory holder in order to overcome at least one aforementioned shortcoming. The exemplary embodiment(s) satisfy such a need by providing an ergonomic accessory holder for a portable electronic device that is convenient and easy to use, lightweight yet durable in design, versatile in its applications, and designed for conveniently carrying a charging cable directly on the portable electronic device. The present application discloses at least one embodiment that is patentably distinguishable relative to U.S. Pat. No. 9,787,808, which is owned by the Applicant of the present application.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an ergonomic accessory holder for a portable electronic device. The present application discloses at least one embodiment that is patentably distinguishable relative to U.S. Pat. No. 9,787,808, which is owned by the Applicant of the present application. These and other objects, features, and advantages of the non-limiting exemplary embodiment(s) are provided by an ergonomic accessory holder including a single and continuous body affixed to a rear side of the existing portable electronic device. Such a body includes a plurality of contiguous sides configured at an end-to-end pattern spaced inwardly from an outer perimeter of the portable electronic device, and a posterior face integral with the contiguous sides and monolithically attached thereto. Such a posterior face further is intermediately seated between the contiguous sides. Advantageously, the posterior face has a surface area less than a surface area of a rear side of the existing portable electronic device such that the body does not block a camera lens of the existing portable electronic device. Such a structural configuration provides the new, useful, and unexpected result of facilitating adhesive connection of the single and unitary body to a variety of portable electronic devices having unique shapes and sizes. Such a benefit overcomes the shortcoming of U.S. Pat. No. 9,787,808 wherein each customized body must be suitably shaped and sized to elastically fit about a variety of different shapes and sizes of portable electronic devices. The claimed subject matter of the present disclosure overcomes such an undesirable deficiency.

In a non-limiting exemplary embodiment, the posterior face includes a non-linear groove spaced inwardly of an outer perimeter of the posterior face and the contiguous sides. Such a groove includes a proximal end having a first surface area, and a non-linear medial section being directly extended from the proximal end and disposed along a central longitudinal portion of the groove, wherein the medial section has a substantially uniform width. The groove further includes a distal end directly extended from the medial section and disposed adjacent to the proximal end, wherein the distal end has a second surface area smaller than the first surface area. Advantageously, an entire longitudinal length of the charging cable is removably nested within the groove.

In a non-limiting exemplary embodiment, the ergonomic accessory holder further includes a handle configured to be adhesively affixed to rear side of the existing portable electronic device. The body further includes an aperture centrally registered with a centrally registered longitudinal axis of the body. Such an aperture is juxtaposed to the groove and situated adjacent to the non-linear medial section of the groove. Advantageously, the handle is centrally positioned within the aperture and configured to be accessed from via the aperture while the body is affixed to the rear side of the existing portable electronic device.

In a non-limiting exemplary embodiment, the handle includes a disc-shaped base centrally disposed within a circumference of the aperture, and a ring pivotally coupled to the disc-shaped base. Advantageously, the ring is circumscribed about the disc-shaped base when the ring is articulated to a lowered position substantially coplanar to the disc-shaped base.

In a non-limiting exemplary embodiment, the ergonomic accessory holder further includes a charging cable removably attached to the posterior face of the body in such a manner that a first portion and a second portion of the charging cable each is selectively peeled away from the posterior face while a remaining central portion maintains direct contact with the posterior face. Advantageously, an entire longitudinal length of the charging cable is positioned at the posterior face when each of the first portion and the second portion are substantially coplanar with the posterior face; wherein the charging cable is flexible and deformable.

In a non-limiting exemplary embodiment, the charging cable includes a first conductive end located at the first portion and a second conductive end located at the second portion. Such a charging cable is exposed while seated within the groove such that the first conductive end and the second conductive end each is removable from the groove while the central portion of the charging cable remains attached to the major longitudinal length of the medial section of the groove.

In a non-limiting exemplary embodiment, each of the first portion and the second portion traverses the centrally registered longitudinal axis.

In a non-limiting exemplary embodiment, the charging cable has an outer surface substantially flush-mounted and substantially coplanar with the posterior face of the body.

In a non-limiting exemplary embodiment, the body is deformably resilient and is capable of being selectively affixed to the existing portable electronic device.

In a non-limiting exemplary embodiment, each of the groove and the charging cable is coextensively oriented along a serpentine shape located at the posterior face.

In a non-limiting exemplary embodiment, the first conductive end is removably nested within the proximal end of the groove, and the second conductive end is removably nested within the distal end of the groove.

In a non-limiting exemplary embodiment, the posterior surface of the body has a smooth outermost surface.

In a non-limiting exemplary embodiment, the posterior surface of the body has a corrugated and uneven outermost surface.

The present disclosure further includes a method of utilizing an ergonomic accessory holder for an existing portable electronic device. Such a method includes the steps of: providing an existing portable electronic device; and providing and affixing a single and continuous body to a rear side of the existing portable electronic device. Advantageously, the single and continuous body includes a plurality of contiguous sides being configured at an end-to-end pattern spaced inwardly from an outer perimeter of the portable electronic device, and a posterior face being integral with the contiguous sides and monolithically attached thereto. The posterior face further is intermediately seated between the contiguous sides. Advantageously, the posterior face has a surface area less than a surface area of a rear side of the existing portable electronic device such that the body does not block a camera lens of the existing portable electronic device. Such method steps provide the new, useful, and unexpected result of facilitating adhesive connection of the single and unitary body to a variety of portable electronic devices having unique shapes and sizes. Such a benefit overcomes the shortcoming of U.S. Pat. No. 9,787,808 wherein each customized body must be suitably shaped and sized to elastically fit about a variety of different shapes and sizes of portable electronic devices. The claimed subject matter of the present disclosure overcomes such an undesirable deficiency.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 5 is a top plan view of the ergonomic accessory holder shown in FIG. 2;

FIG. 5A is a side elevational view of the ergonomic accessory holder shown in FIG. 5;

FIG. 5B is a bottom plan view of the ergonomic accessory holder shown in FIG. 5;

FIG. 6 is a top plan view of the ergonomic accessory holder shown in FIG. 1;

FIG. 6A is a side elevational view of the ergonomic accessory holder shown in FIG. 6;

FIG. 6B is a bottom plan view of the ergonomic accessory holder shown in FIG. 6;

Figure 1:
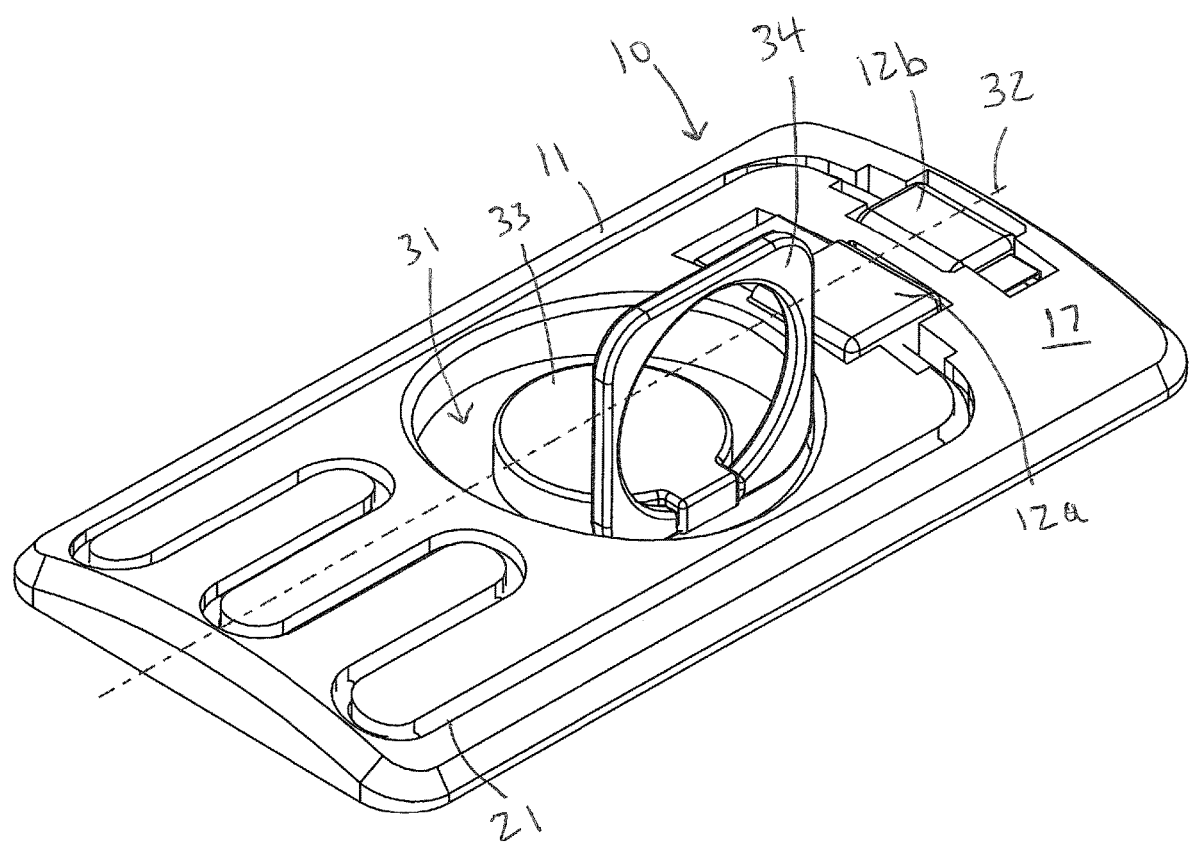
FIG. 1 is a perspective view of an ergonomic accessory holder for a portable electronic device, in accordance with a non-limiting exemplary embodiment of the present disclosure.
Figure 2:
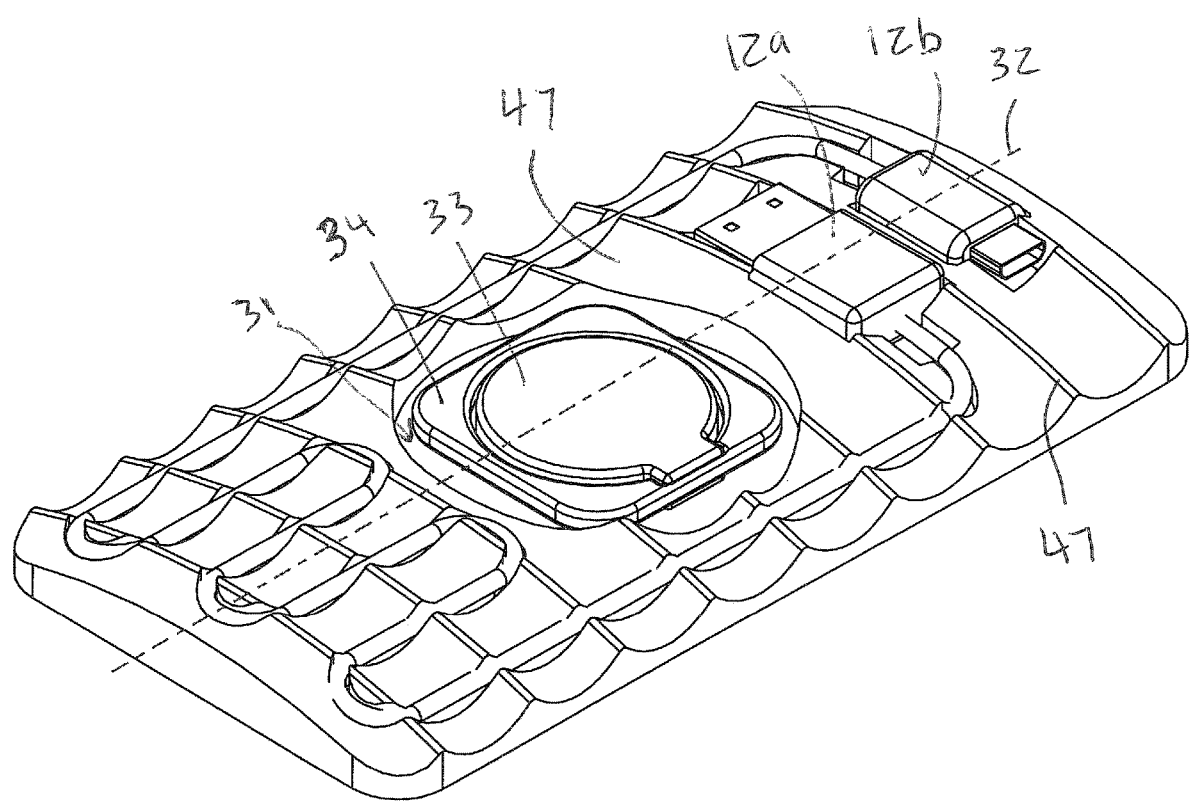
FIG. 2 is a perspective view of an ergonomic accessory holder for a portable electronic device, in accordance with another non-limiting exemplary embodiment of the present disclosure.
Figure 3:
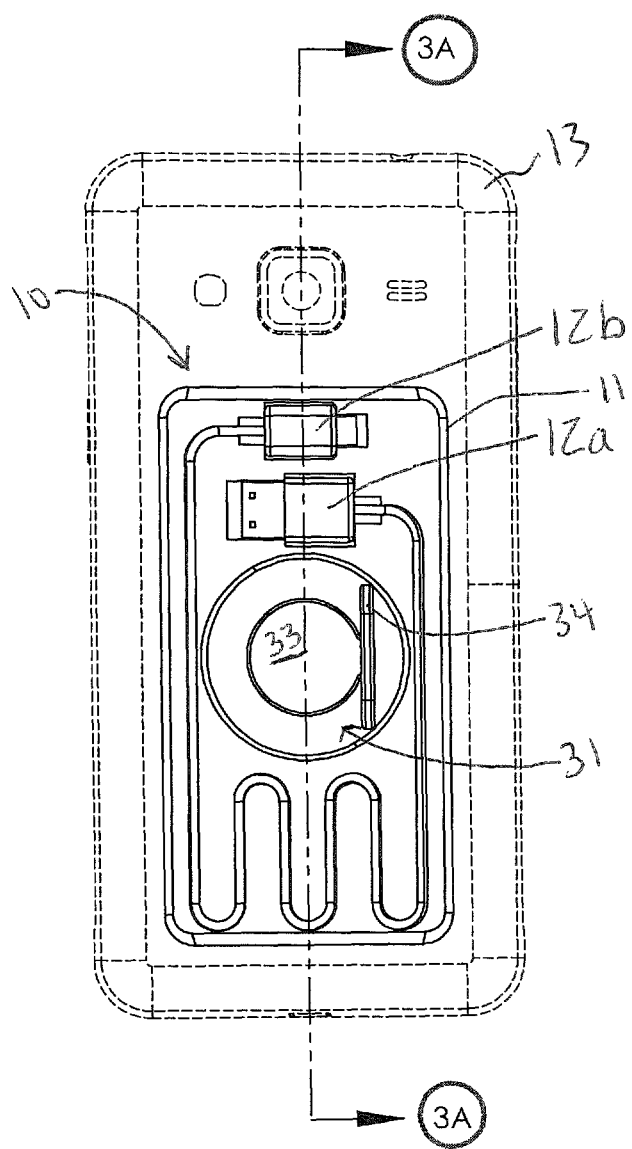
FIG. 3 is a top plan view of the ergonomic accessory holder shown in FIG. 1.
Figure 3A:
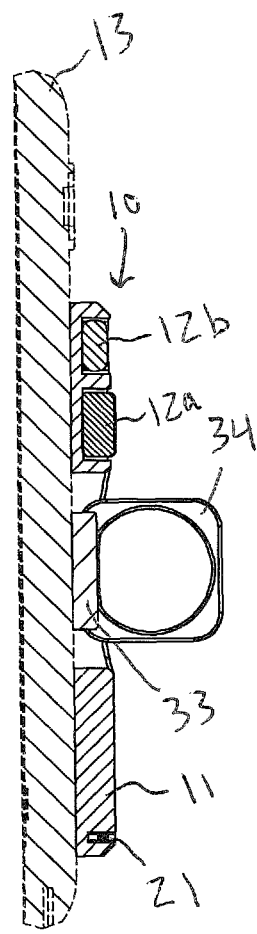
FIG. 3A is a cross-sectional view taken along line 3A-3A in FIG. 3.
Figure 4:
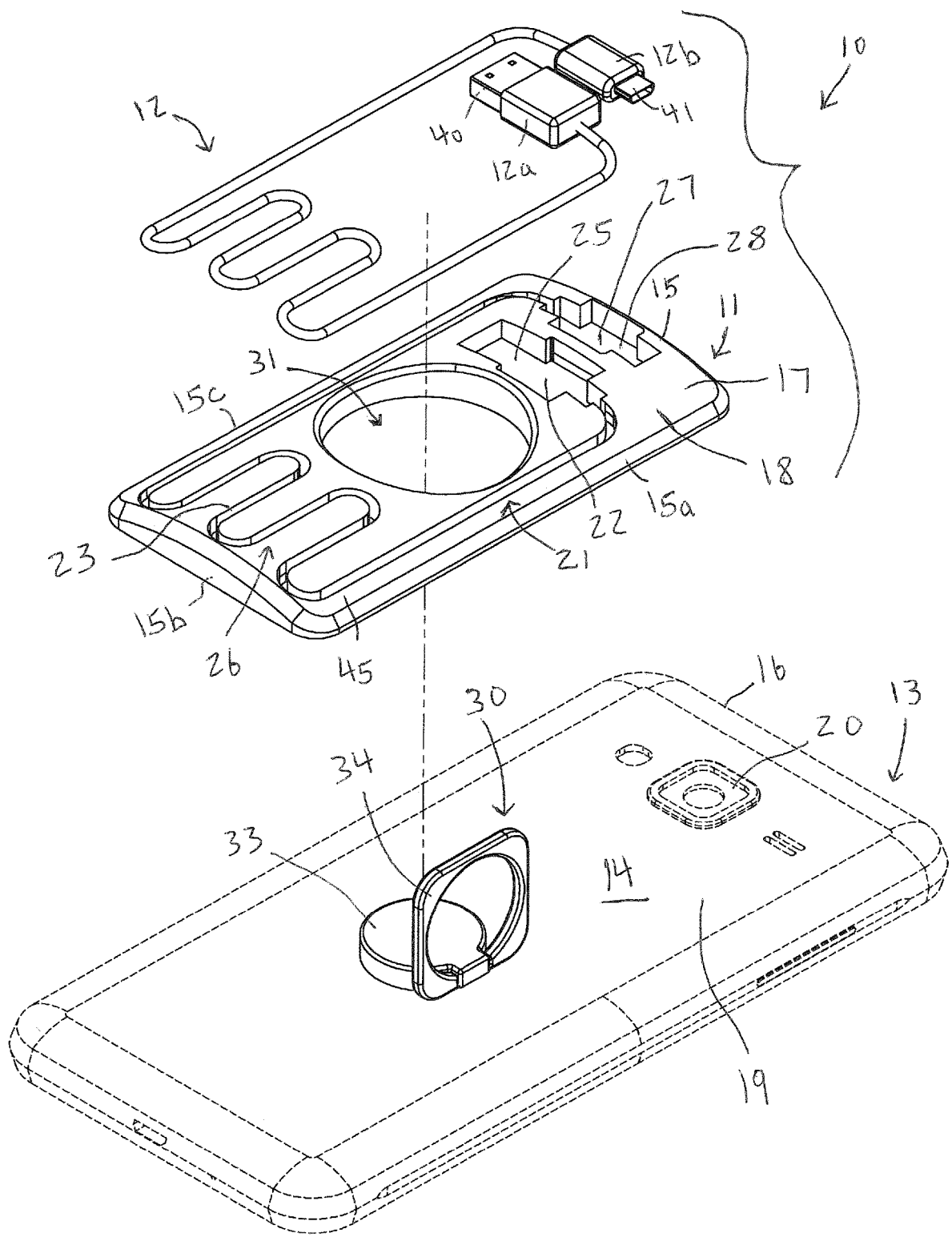
FIG. 4 is an exploded view of the ergonomic accessory holder shown in FIG. 1.
Figure 7:
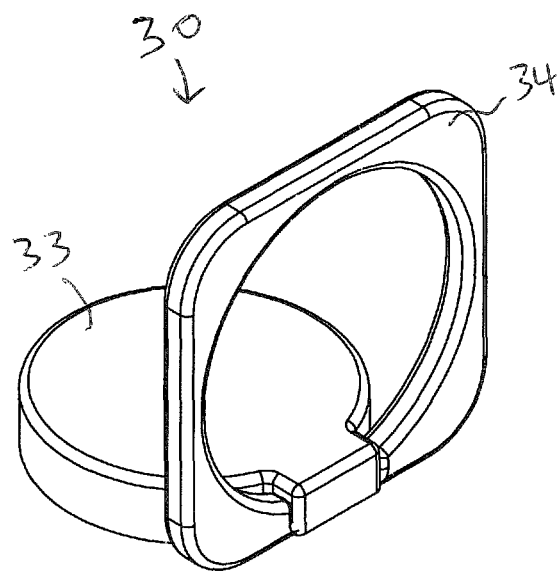
FIG. 7 is a perspective view of the handle shown in FIGS. 1 and 2, wherein the ring is pivoted to a raised (open) position for receiving a user metacarpal therethrough.
Figure 7A:
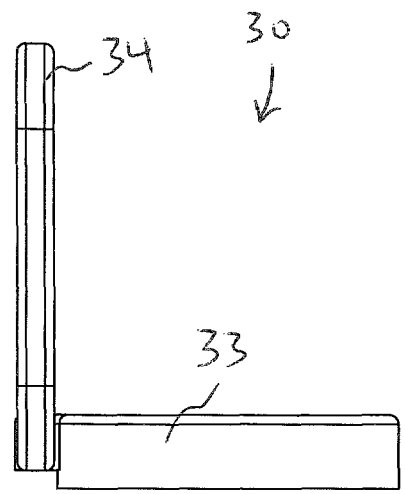
FIG. 7A is a side elevational view of the handle shown in FIG. 7.
Figure 7B:
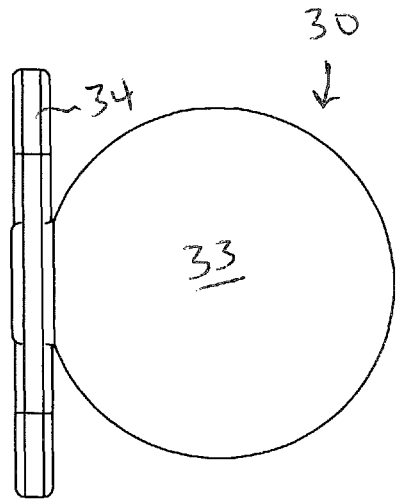
FIG. 7B is a top plan view of the handle shown in FIG. 7.
Figure 7C:
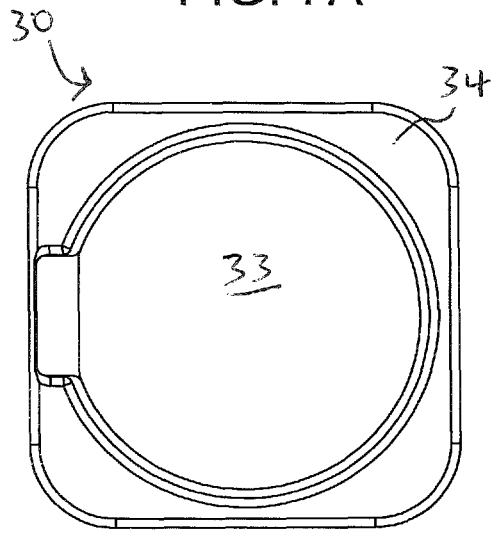
FIG. 7C is a top plan view of the handle biased at a lowered (closed) position.
Figure 8:
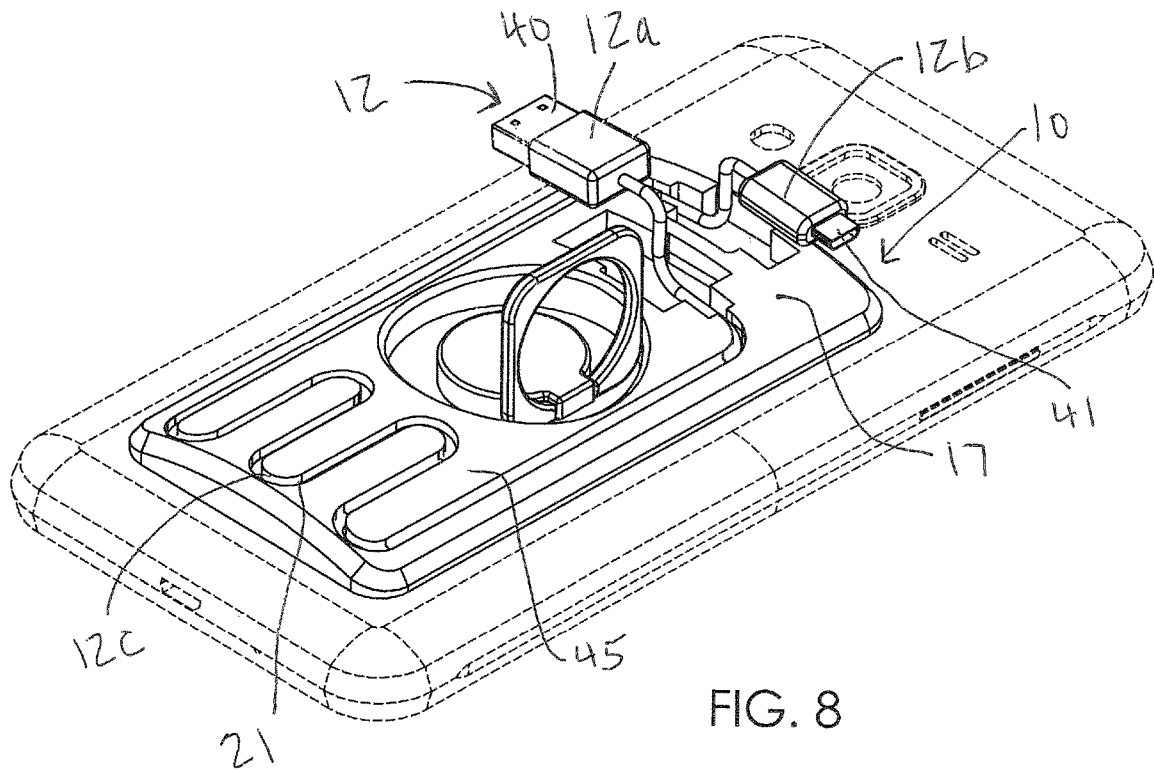
FIG. 8 is a perspective view of the ergonomic accessory holder of FIG. 1 attached to a rear side of a portable electronic device, wherein opposed ends of the charging cable are peeled away from the groove.
Figure 9:
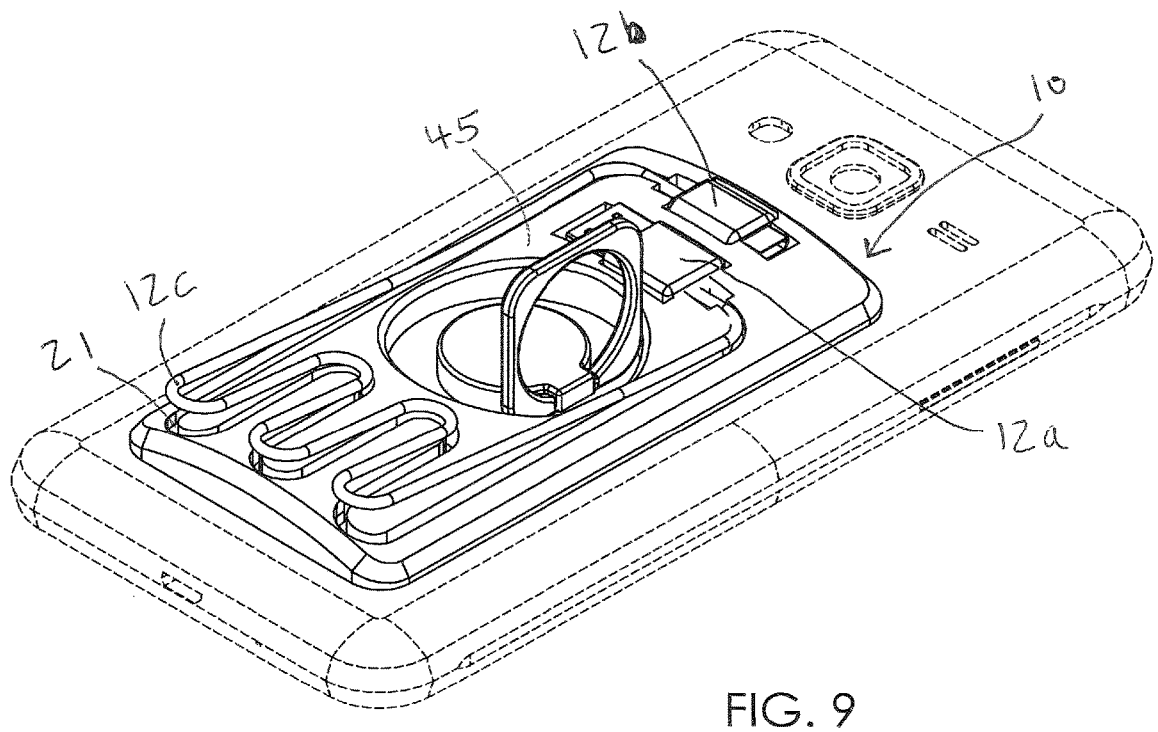
FIG. 9 is a perspective view of the ergonomic accessory holder of FIG. 1 attached to a rear side of a portable electronic device, wherein the medial section of the charging cable are peeled away from the groove.
Figure 10:
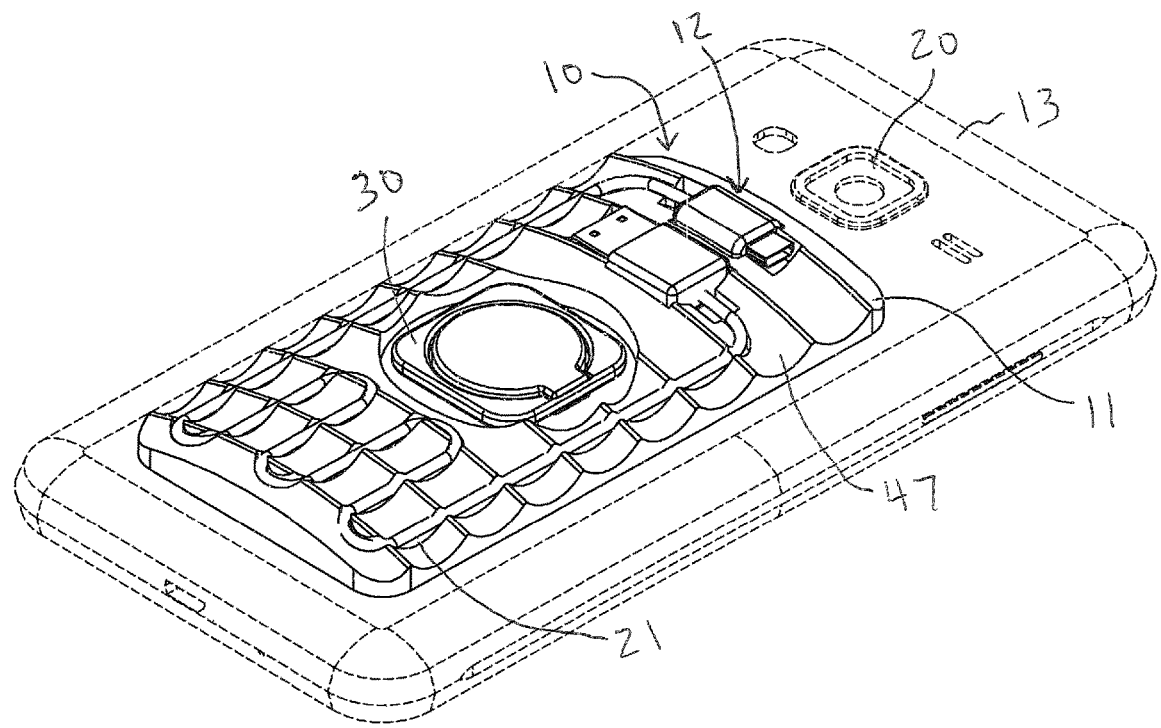
FIG. 10 is a perspective view of the ergonomic accessory holder of FIG. 2 attached to a rear side of a portable electronic device.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to body any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-11 and is/are intended to provide an ergonomic accessory holder 10 for a portable electronic device 13 (e.g., cellular phone, smart phone, tablet, etc.). The present application discloses embodiment(s) that is/are patentably distinguishable from U.S. Pat. No. 9,787,808, which is owned by the Applicant of the present application. The purpose of redesigning the previous disclosure was to make the present accessory holder 10 universal and avoid having to alter the design for other (newer) phones on the market. It also allows consumers to utilize the accessory for other mobile devices as well.

Referring to FIGS. 1-11 in general, the ergonomic accessory holder 10 includes a single and continuous body 11 affixed to a rear side 14 of the existing portable electronic device 13 or a protective case/cover of the portable electronic device 13. Such a body 11 includes a plurality of contiguous sides 15-15c configured at an end-to-end pattern spaced inwardly from an outer perimeter 16 of the device 13. The body 11 also includes a posterior face 17 integral with the contiguous sides 15-15c. Such a posterior face 17 is intermediately seated between the contiguous sides 15-15c and monolithically attached thereto. Advantageously, the posterior face 17 has a surface area 18 less than a surface area 19 of the rear side 14 of the existing portable electronic device 13 such that body 11 does not block a camera lens 20 of the existing portable electronic device 13. Such a structural configuration provides the new, useful, and unexpected result of facilitating adhesive connection of the single and unitary body 11 to a variety of portable electronic devices having unique shapes and sizes (e.g., tablets, phones, etc.). Such a benefit overcomes the shortcoming of U.S. Pat. No. 9,787,808 wherein each customized body 11 must be suitably shaped and sized to elastically stretch and fit about a variety of different shapes and sizes of portable electronic devices. The claimed subject matter of the present disclosure overcomes such an undesirable deficiency.

In a non-limiting exemplary embodiment, the body 11 is non-elastic and non-resilient, and is provided with an adhesive layer attached to a bottom surface of the body 11. In this manner, the body 11 has a fixed size and shape so a user does not need to stretch and frictionally fit body 11 about an outer perimeter of the portable electronic device 13.

In a non-limiting exemplary embodiment, the posterior face 17 includes a non-linear (e.g., serpentine, winding, etc.) groove 21 spaced inwardly of an outer perimeter 16 of the posterior face 17 and the contiguous sides 15-15c of body 11. Such a groove 21 includes a proximal end 22 having a first surface area 25, and a non-linear medial section 23 directly extended from the proximal end 22 and disposed along a central longitudinal (serpentine, winding) portion 26 of the groove 21, wherein the medial section 23 of groove 21 has a substantially uniform width. The groove 21 further includes a distal end 27 directly extended from the medial section 23 and disposed adjacent to the proximal end 22, wherein the distal end 27 has a second surface area 28 smaller than the first surface area 25. Advantageously, an entire longitudinal length of the charging cable 12 is removably nested within the groove 21.

In a non-limiting exemplary embodiment, the ergonomic accessory holder 10 further includes a handle 30 configured to be adhesively affixed to the rear side 14 of the existing portable electronic device 13. The body 11 further includes an aperture 31 centrally registered with a centrally registered longitudinal axis 32 of the body 11. Such an aperture 31 is juxtaposed to the groove 21 and situated adjacent to the non-linear medial section 23 of the groove 21. Advantageously, the handle 30 is centrally positioned within the aperture 31 and configured to be accessed from via the aperture 31 while the body 11 is affixed to the rear side 14 of the existing portable electronic device 13.

In a non-limiting exemplary embodiment, the handle 30 includes a disc-shaped base 33 centrally disposed within a circumference of the aperture 31, and a ring 34 pivotally coupled to the disc-shaped base 33. Advantageously, the ring 34 is circumscribed about the disc-shaped base 33 when the ring 34 is articulated to a lowered position substantially coplanar to the disc-shaped base 33. The ring 34 is pivoted between raised (open) and lowered (closed) positions relative to disc-shaped base 33.

In a non-limiting exemplary embodiment, the ergonomic accessory holder 10 further includes a charging cable 12 removably attached to the posterior face 17 of the body 11 in such a manner that a first portion 12a and a second portion 12b of the charging cable 12 each is selectively peeled away from the posterior face 17 while a remaining central portion 12c maintains direct contact with the posterior face 17 and groove 21. Advantageously, an entire longitudinal length of the charging cable 12 is positioned at the posterior face 17 (via groove 21) when each of the first portion 12a and the second portion 12b are substantially coplanar with the posterior face 17 (at groove 21). In this manner, the charging cable 12 is flexible and deformable.

In a non-limiting exemplary embodiment, the charging cable 12 includes a first conductive end 40 located at the first portion 12a and a second conductive end 41 located at the second portion 12b. Such a charging cable 12 is exposed while seated within the groove 21 such that the first conductive end 40 and the second conductive end 41 each is selectively removable from the groove 21 while the central portion 12c of the charging cable 12 remains attached to the major longitudinal length of the medial section 23 of the groove 21.

In a non-limiting exemplary embodiment, each of the first portion 12a and the second portion 12b traverses the centrally registered longitudinal axis 32, when seated within groove 21.

Figure 11:
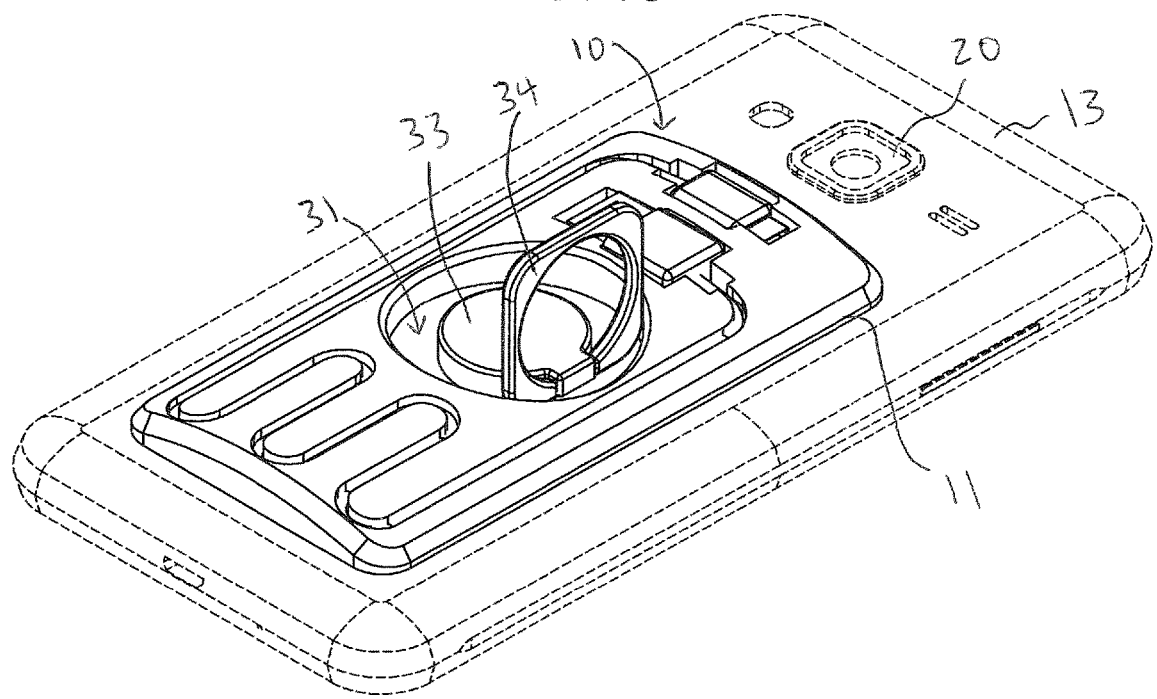
FIG. 11 is a perspective view of the ergonomic accessory holder of FIG. 1 attached to a rear side of a portable electronic device, wherein the entire charging cable is seated within the groove.

In a non-limiting exemplary embodiment, FIG. 11, the charging cable 12 has an outer surface substantially flush-mounted and substantially coplanar with the posterior face 17 of the body 11 (e.g., charging cable 12 is nested within groove 21).

In a non-limiting exemplary embodiment, the body 11 is semi-rigid and capable of being selectively affixed to the existing portable electronic device 13.

In a non-limiting exemplary embodiment, each of the groove 21 and the charging cable 12 is coextensively oriented along a serpentine shape located at the posterior face 17.

In a non-limiting exemplary embodiment, the first conductive end 40 is removably nested within the proximal end 22 of the groove 21, and the second conductive end 41 is removably nested within the distal end 27 of the groove 21.

In a non-limiting exemplary embodiment, the posterior surface of the body 11 has a smooth outermost surface 45.

In a non-limiting exemplary embodiment, the posterior surface of the body 11 has a corrugated (e.g., ribbed, oscillating, wavy, etc.) and uneven outermost surface 47 for improved gripping.

The present disclosure further includes a method of utilizing an ergonomic accessory holder 10 for an existing portable electronic device 13. Such method includes the steps of: providing an existing portable electronic device 13; and providing and affixing a single and continuous body 11 to a rear side 14 of the existing portable electronic device 13. Advantageously, the single and continuous body 11 includes a plurality of contiguous sides 15-15c being configured at an end-to-end pattern spaced inwardly from an outer perimeter 16 of the portable electronic device 13, and a posterior face 17 integral with the contiguous sides 15-15c. The posterior face 17 further is intermediately seated between the contiguous sides 15-15c and monolithically attached thereto. Advantageously, the posterior face 17 has a surface area 18 less than a surface area 19 of a rear side 14 of the existing portable electronic device 13 such that the body 11 does not block a camera lens 20 of the existing portable electronic device 13. Such method steps provide the new, useful, and unexpected result of facilitating adhesive connection of the single and unitary body 11 to a variety of portable electronic devices having unique shapes and sizes (e.g., tablets, phones, etc.). Such a benefit overcomes the shortcoming of U.S. Pat. No. 9,787,808 wherein each customized body 11 must be suitably shaped and sized to elastically stretch and fit about a variety of different shapes and sizes of portable electronic devices. The claimed subject matter of the present disclosure overcomes such an undesirable deficiency.

Referring to FIGS. 1-11 in general, the ergonomic accessory holder 10 with integrated charging cord (charging cable 12) for phones and tablets is disclosed. The body 11 is designed to be attached to an existing portable electronic device 13. Tablet/Phone 13 is charged by removing the two removable parts of the integrated charging cord (charging cable 12) from groove 21 and connecting one part to the tablet/phone's charging port and the other part to any available USB port at a power supply source. Once the desired charging capacity is achieved, the charging cord (charging cable 12) is stored back into body 11 by reattaching the charging cord (charging cable 12) back into groove 21.

Referring to FIGS. 1-11 in general, in a non-limiting exemplary embodiment(s), the combined body 11 and USB cord (charging cable 12) are referred to collectively at 10, which presents smartphone users with a protective accessory for a smartphone that would not only offer shock-absorbent protection for the phone, but also provide a spare USB/micro-USB charger cable, and a convenient, secure way for carrying the cable, detachably, on the back of the phone case. By combining the spare charging cable 12 and the body 11 into an integrated unit (accessory holder 10), the combined body 11 and USB cord (charging cable 12) ensures that smartphone users can recharge their phone's battery from any device or adapter equipped with a USB port—thus freeing them of the need to carry a charger along, or to carry a separate USB charging cable.

In a non-limiting exemplary embodiment, the accessory holder 10 includes a body 11 and USB cord (charging cable 12), which can be fabricated in molded rubber and/or a flexible plastic polymer. As noted above, body 11 preferably has a semi-rigid shape that is not elastic or intended to be stretched about a phone's outer perimeter. The ergonomically designed body 11 can be produced in a variety of colors, textures, and patterns. The combined body 11 and USB cord (charging cable 12) (collectively accessory holder 10) may also be produced in several versions for the most popular tablet computers, thus greatly expanding the potential market for the accessory holder 10. The accessory holder 10 might also be produced for popular e-readers such as the KINDLE®, for example.

In a non-limiting exemplary embodiment, the accessory holder 10 includes a combined body 11 and USB cord (charging cable 12), which differs from conventional smartphone and tablet accessory holders in that a posterior face 17 of the body 11 is slightly thicker—perhaps 5 to 20 millimeters in total thickness. The posterior face 17 of the body 11 can be molded to incorporate a peripheral, serpentine groove 21 that will receive and securely hold the USB/micro-USB charging cable 12 specifically configured to the electronic device 13 (e.g., IPHONE®, ANDROID®, GALAXY®, etc.) The larger, USB-plug end of the cable 12 will fit snugly into a dedicated niche or recess in the upper center of the posterior face 17. The cable 12 is nested in groove 21 and remains flush (coplanar) with the posterior face 17 of the body 11. Thus, cable 12 fits snugly into a form-fitting channel or groove 21 that partially runs down the center of the posterior face 17, then adjacent to a side of the posterior face 17, up to the top of the posterior face 17, and around and down the other side of the posterior face 17, terminating to define a storage position of the micro-USB plug, which is itself held in place within a form-fitting niche.

This ergonomic accessory holder 10 is designed to be compatible with any portable electronic device 13. The users always conveniently have their phone charger on them; therefore, you can never forget your charger. You no longer must carry a separate phone charger with you. Does not require to be charged, it is always usable. The ergonomic accessory holder 10 is compatible with any mobile device or tablet.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to body all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to body all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. An ergonomic accessory holder for an existing portable electronic device, said ergonomic accessory holder comprising: a body affixed to a rear side of the existing portable electronic device, said body including
    a plurality of contiguous sides being configured at an end-to-end pattern spaced inwardly from an outer perimeter of the existing portable electronic device such that said body does not block a camera lens of the existing portable electronic device; and
    a handle configured to be adhesively affixed to said rear side of the existing portable electronic device; wherein said body further comprises an aperture centrally registered with a centrally registered longitudinal axis of said body, said aperture being juxtaposed to said groove and situated adjacent to said non-linear medial section of said groove; wherein said handle is centrally positioned within said aperture and configured to be accessed from via said aperture while said body is affixed to the rear side of the existing portable electronic device;
    a posterior face being integral with said contiguous sides and monolithically attached thereto, said posterior face further being intermediately seated between said contiguous sides; wherein said posterior face comprises:
    a non-linear groove spaced inwardly of an outer perimeter of said posterior face and said contiguous sides, said groove including
    a proximal end having a first surface area,
    a non-linear medial section being directly extended from said proximal end and disposed along a central longitudinal portion of said groove, said medial section having a substantially uniform width, and
    a distal end being directly extended from said medial section and disposed adjacent to said proximal end, said distal end having a second surface area smaller than said first surface area.

2. An ergonomic accessory holder for an existing portable electronic device, said ergonomic accessory holder comprising: a single and continuous body affixed to a rear side of the existing portable electronic device, said body including a plurality of contiguous sides being configured at an end-to-end pattern spaced inwardly from an outer perimeter of the existing portable electronic device; and a handle configured to be adhesively affixed to said rear side of the existing portable electronic device; wherein said body further comprises an aperture centrally registered with a centrally registered longitudinal axis of said body, said aperture being juxtaposed to said groove and situated adjacent to said non-linear medial section of said groove; wherein said handle is centrally positioned within said aperture and configured to be accessed from via said aperture while said body is affixed to the rear side of the existing portable electronic device;

a posterior face being integral with said contiguous sides and monolithically attached thereto, said posterior face further being intermediately seated between said contiguous sides;

wherein said posterior face has a surface area less than a surface area of a rear side of the existing portable electronic device such that said body does not block a camera lens of the existing portable electronic device;

wherein said posterior face comprises: a non-linear groove spaced inwardly of an outer perimeter of said posterior face and said contiguous sides, said groove including a proximal end having a first surface area, a non-linear medial section being directly extended from said proximal end and disposed along a central longitudinal portion of said groove, said medial section having a substantially uniform width, and a distal end being directly extended from said medial section and disposed adjacent to said proximal end, said distal end having a second surface area smaller than said first surface area.

3. The ergonomic accessory holder of claim 2, wherein said handle comprises:

a disc-shaped base centrally disposed within a circumference of said aperture; and a ring pivotally coupled to said disc-shaped base;

wherein said ring is circumscribed about said disc-shaped base when said ring is articulated to a lowered position substantially coplanar to said disc-shaped base.

4. The ergonomic accessory holder of claim 3, further comprising:

a charging cable removably attached to said posterior face of said body in such a manner that a first portion and a second portion of said charging cable each is selectively peeled away from said posterior face while a remaining central portion maintains direct contact with said posterior face;

wherein an entire longitudinal length of said charging cable is positioned at said posterior face when each of said first portion and said second portion are substantially coplanar with said posterior face;

wherein said charging cable is flexible and deformable.

5. The ergonomic accessory holder of claim 4, wherein said charging cable comprises: a first conductive end located at said first portion and a second conductive end located at said second portion, said charging cable being exposed while seated within said groove such that said first conductive end and said second conductive end each is removable from said groove while said central portion of said charging cable remains attached to the major longitudinal length of said medial section of said groove.

6. The ergonomic accessory holder of claim 5, wherein each of said first portion and said second portion traverses the centrally registered longitudinal axis when nested in said groove.

7. The ergonomic accessory holder of claim 6, wherein said charging cable has an outer surface substantially flush-mounted and substantially coplanar with said posterior face of said body.

8. The ergonomic accessory holder of claim 7, wherein said body is deformably resilient and is capable of being selectively affixed to the existing portable electronic device.

9. The ergonomic accessory holder of claim 8, wherein each of said groove and said charging cable is coextensively oriented along a serpentine shape located at said posterior face.

10. The ergonomic accessory holder of claim 9, wherein said first conductive end is removably nested within said proximal end of said groove;

wherein said second conductive end is removably nested within said distal end of said groove.

11. The ergonomic accessory holder of claim 2, wherein said posterior surface of said body has a smooth outermost surface.

12. The ergonomic accessory holder of claim 2, wherein said posterior surface of said body has a corrugated and uneven outermost surface.

13. A method of utilizing an ergonomic accessory holder for an existing portable electronic device, said method comprising the steps of:

providing an existing portable electronic device; and providing and affixing a single and continuous body to a rear side of the existing portable electronic device, said single and continuous body including a plurality of contiguous sides being configured at an end-to-end pattern spaced inwardly from an outer perimeter of the existing portable electronic device, and a handle configured to be adhesively affixed to said rear side of the existing portable electronic device; wherein said body further comprises an aperture centrally registered with a centrally registered longitudinal axis of said body, said aperture being juxtaposed to said groove and situated adjacent to said non-linear medial section of said groove; wherein said handle is centrally positioned within said aperture and configured to be accessed from via said aperture while said body is affixed to the rear side of the existing portable electronic device;

a posterior face being integral with said contiguous sides and monolithically attached thereto, said posterior face further being intermediately seated between said contiguous sides;

wherein said posterior face has a surface area less than a surface area of a rear side of the existing portable electronic device such that said body does not block a camera lens of the existing portable electronic device;

wherein said posterior face comprises:

a non-linear groove spaced inwardly of an outer perimeter of said posterior face and said contiguous sides, said groove including a proximal end having a first surface area, a non-linear medial section being directly extended from said proximal end and disposed along a central longitudinal portion of said groove, said medial section having a substantially uniform width, and a distal end being directly extended from said medial section and disposed adjacent to said proximal end, said distal end having a second surface area smaller than said first surface area.

* * * * *